(12) United States Patent
Nakahara et al.

(10) Patent No.: US 12,325,361 B2
(45) Date of Patent: Jun. 10, 2025

(54) MOBILE OBJECT, IMAGE PROCESSING METHOD, AND STORAGE MEDIUM

(71) Applicant: CANON KABUSHIKI KAISHA, Tokyo (JP)

(72) Inventors: Ikunari Nakahara, Kanagawa (JP); Tomoaki Tsuchiya, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 271 days.

(21) Appl. No.: 17/944,309

(22) Filed: Sep. 14, 2022

(65) Prior Publication Data

US 2023/0101459 A1 Mar. 30, 2023

(30) Foreign Application Priority Data

Sep. 27, 2021 (JP) ................. 2021-156439

(51) Int. Cl.
*B60R 1/25* (2022.01)
*B60R 1/26* (2022.01)
(Continued)

(52) U.S. Cl.
CPC .................. *B60R 1/25* (2022.01); *B60R 1/26* (2022.01); *G06T 5/80* (2024.01); *G06V 10/16* (2022.01);
(Continued)

(58) Field of Classification Search
CPC ....... B60R 1/25; B60R 1/26; B60R 2300/105; B60R 2300/20; B60R 2300/303;
(Continued)

(56) References Cited

U.S. PATENT DOCUMENTS 10,509,207 B2 12/2019 Lang
10,868,981 B2 12/2020 Mabuchi
(Continued)

FOREIGN PATENT DOCUMENTS

EP 3451651 A1 3/2019
JP 2004-345554 A 12/2004
(Continued)

OTHER PUBLICATIONS

Jul. 18, 2023 Japanese Official Action in Japanese Patent Appln. No. 2021-156439.
(Continued)

*Primary Examiner* — Farzana Hossain
(74) *Attorney, Agent, or Firm* — Venable LLP

(57) ABSTRACT

In a mobile object, a camera unit including an optical system that forms an optical image having a high-resolution region and a low-resolution region on a light receiving surface of an image pickup element and is disposed on a side of the mobile object, wherein the camera unit is installed to meet the following conditions: A $\tan(h/(d1+x))-\theta v/2<\varphi v<A \tan(h/(d2+x))+\theta v/2$, $\varphi h\_limit=\max(A \tan((w1-y)/(d1+x))-\theta h/2$, A $\tan((w2-y)/(d2+x))-\theta h/2)$, $\varphi h\_limit<\varphi h<-A \tan(y/(d1+x))+\theta h/2$, where $\theta v$ and $\theta h$ denote a vertical and a horizontal field angle of the high-resolution region, $\varphi v$ and $\varphi h$ denote a vertical and a horizontal direction angle of the optical axis of the optical system, x, y, and h denotes offsets, and w1 and w2 denote predetermined widths on the ground at the distances d1 and d2.

16 Claims, 7 Drawing Sheets

(51) Int. Cl.

| | | |
|---|---|---|
| *G06T 5/80* | (2024.01) | |
| *G06V 10/10* | (2022.01) | |
| *G06V 20/56* | (2022.01) | |
| *H04N 5/262* | (2006.01) | |
| *H04N 5/265* | (2006.01) | |
| *H04N 23/698* | (2023.01) | |
| *H04N 23/90* | (2023.01) | |

(52) U.S. Cl.
CPC .......... *G06V 20/56* (2022.01); *H04N 5/2628* (2013.01); *H04N 5/265* (2013.01); *H04N 23/698* (2023.01); *H04N 23/90* (2023.01); *B60R 2300/105* (2013.01); *B60R 2300/20* (2013.01); *B60R 2300/303* (2013.01); *G06T 2207/30252* (2013.01)

(58) Field of Classification Search
CPC .............. B60R 2300/802; G06T 5/006; G06T 2207/30252; G06T 5/80; G06V 10/16; G06V 20/56; G06V 10/147; G06V 10/242; G06V 10/25; G06V 10/803; G06V 20/58; H04N 5/2628; H04N 5/265; H04N 23/698; H04N 23/90; H04N 7/181
See application file for complete search history.

(56) References Cited

U.S. PATENT DOCUMENTS

| | | | |
|---|---|---|---|
| 10,893,208 | B2 | 1/2021 | Sunaga |
| 10,917,610 | B2 | 2/2021 | Aihara |
| 10,946,798 | B2 | 3/2021 | Fürsich |
| 11,159,744 | B2 | 10/2021 | Aihara |
| 11,247,609 | B2 | 2/2022 | Fürsich |
| 11,310,461 | B2 | 4/2022 | Aihara |
| 11,572,017 | B2 | 2/2023 | Fürsich |
| 11,595,631 | B2 | 2/2023 | Nakamura |
| 2011/0128138 | A1* | 6/2011 | Yamamoto ........ B60W 30/0956 348/148 |
| 2016/0137126 | A1 | 5/2016 | Fürsich |
| 2018/0160052 | A1 | 6/2018 | Aihara |
| 2019/0124277 | A1* | 4/2019 | Mabuchi .............. H04N 25/535 |
| 2019/0273889 | A1* | 9/2019 | Aihara .................... G02B 13/18 |
| 2020/0036903 | A1 | 1/2020 | Sunaga |
| 2021/0127086 | A1 | 4/2021 | Aihara |
| 2021/0160437 | A1* | 5/2021 | Higuchi .............. G06F 18/2163 |
| 2021/0188167 | A1 | 6/2021 | Fürsich |
| 2021/0400209 | A1* | 12/2021 | Yamanaka .......... H04N 23/698 |
| 2022/0070434 | A1 | 3/2022 | Nakamura |
| 2022/0161720 | A1 | 5/2022 | Fürsich |
| 2023/0415652 | A1* | 12/2023 | Wada ....................... B60R 1/25 |

FOREIGN PATENT DOCUMENTS

| | | |
|---|---|---|
| JP | 2006-343545 A | 12/2006 |
| JP | 2010-095202 A | 4/2010 |
| JP | 2012-156672 A | 8/2012 |
| JP | 2015-121591 A | 7/2015 |
| JP | 2018-171964 A | 11/2018 |
| WO | 2014/204794 A1 | 12/2014 |
| WO | 2018/016305 A1 | 1/2018 |
| WO | 2018/061882 A1 | 4/2018 |
| WO | 2019/123840 A1 | 6/2019 |
| WO | 2020/184286 A1 | 9/2020 |

OTHER PUBLICATIONS

Mar. 1, 2023 European Official Action in European Patent Appln. No. 22192763.5.

Apr. 11, 2023 Japanese Official Action in Japanese Patent Appln. No. 2021-156439.

Dec. 5, 2023 Japanese Official Action in Japanese Patent Appln. No. 2021-156439.

* cited by examiner

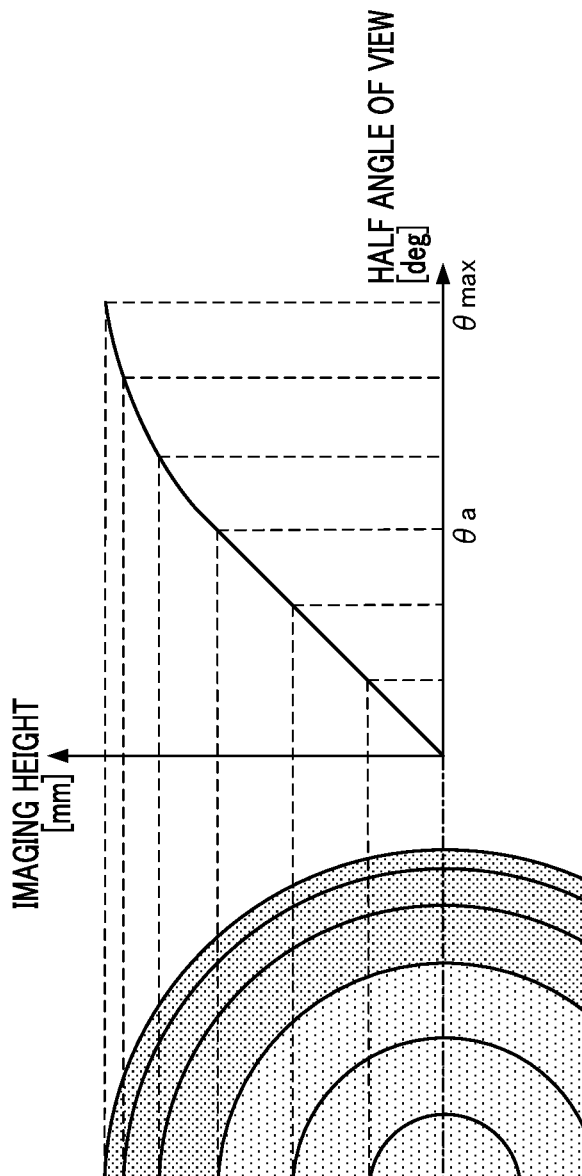
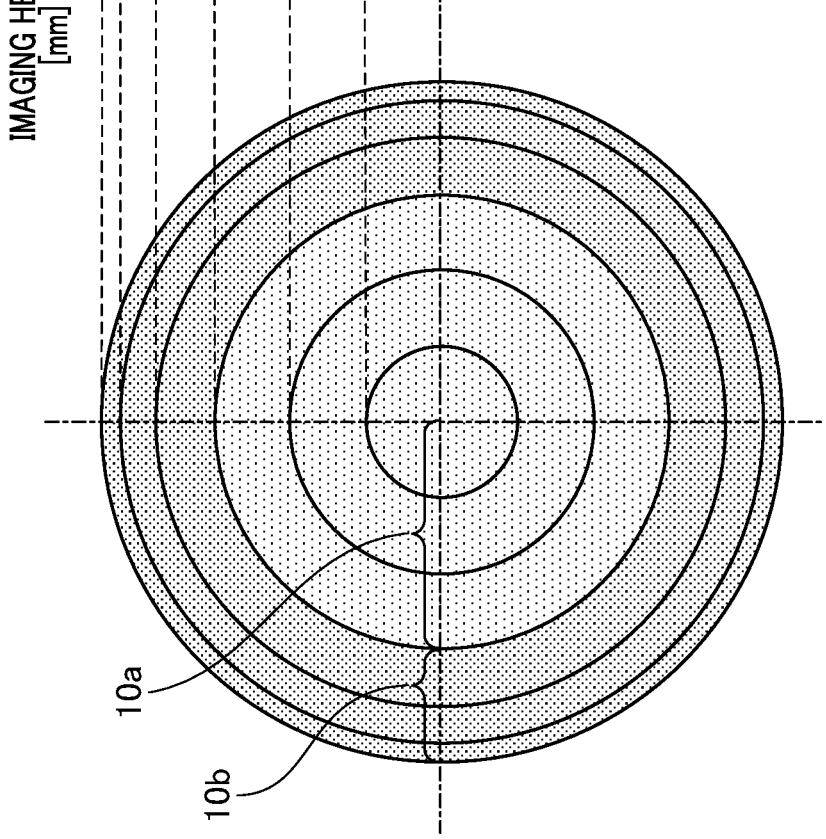

MOBILE OBJECT, IMAGE PROCESSING METHOD, AND STORAGE MEDIUM

BACKGROUND OF THE INVENTION

Field of the Invention

The present invention relates to a mobile object having a camera unit, an image processing method, and a storage medium, and the like.

Description of the Related Art

In recent years, a demand for replacing a room mirror (rear-view mirror) mounted on a vehicle with an electronic room mirror has increased. For example, Japanese Patent Application Laid-Open No. 2010-95202 discloses an electronic room mirror system comprising an image pickup means in which an imaging range is the rear side outside the vehicle and a display means provided in the vehicle, wherein an image picked up by the image pickup means is displayed on a display in the vehicle so that drivers can confirm the rear of the vehicle.

In addition, there is a backward direction confirmation system that allows drivers to confirm a blind spot which is an area at the rear of the vehicle when the driver backs the vehicle. Japanese Patent Application Laid-Open No. 2004-345554 discloses a backward direction confirmation system in which a camera for picking up an image of the rear of a vehicle is provided and, the picked-up image is displayed in the vehicle compartment so that the driver can confirm a blind spot behind the vehicle when the driver backs the vehicle.

The camera serving as an image pickup means for picking up images for an electronic room mirror described above is required to have a high resolution so that the driver more precisely confirms the state of a relatively long distance in the backward direction. In contrast, a camera for backward direction confirmation system is required to pick up images for a wider range so that the safety in a wider range including a blind spot at the rear of the vehicle and the rear side directions is confirmed in order to avoid a collision when the vehicle backs.

Further, in a vehicle in which the electronic room mirror system and the backward direction confirmation system are installed at the same time, if the camera for the electronic room mirror system and the camera for the backward direction confirmation system are individually installed, an in-vehicle image processing system becomes complicated. Such a drawback also occurs, for example, in an automatic driving system in which automatic driving and the like is performed with a plurality of cameras that are arranged for image pickup of the surroundings of the vehicle.

To solve the drawback, a camera using, for example, a special ultra-wide-angle lens is adopted, and the number of cameras installed in the vehicle can be reduced. However, the distortion in the peripheral portion is high even though a wide field angle can be obtained when the ultra-wide-angle lens and the like are used, and display of an image with high resolution and low distortion on the electronic side mirrors or the like is difficult.

SUMMARY OF THE INVENTION

One aspect of the invention relates to a mobile object comprising: a camera unit that has an optical system that forms an optical image having a high-resolution region and a low-resolution region on a light receiving surface of an image pickup element and is disposed on a side of the mobile object, wherein the camera unit is installed to meet the following conditions:

$$A\tan(h/(d1+x))-\theta v/2 < \varphi v < A\tan(h/(d2+x))+\theta v/2 \quad \text{(Formula 2)}$$

$$\varphi h\_\text{limit}=\max(A\tan((w1-y)/(d1+x))-\theta h/2, A\tan((w2-y)/(d2+x))-\theta h/2) \quad \text{(Formula 3)}$$

$$\varphi h\_\text{limit} < \varphi h < -A\tan(y/(d1+x))+\theta h/2 \quad \text{(Formula 4)},$$

where $\theta v$ denotes a vertical field angle of the high-resolution region, $\theta h$ denotes a horizontal field angle of the high-resolution region, $\varphi v$ denotes a vertical direction angle of the optical axis of the optical system, $\varphi h$ denotes a horizontal direction angle of the optical axis of the optical system, x denotes an offset between a driver's viewpoint and the camera unit in the long axis direction of the mobile object, y denotes an offset between the camera unit and a side face of the mobile object in the short axis direction of the mobile object, h denotes an offset between the camera unit and the ground in the height direction, d1 and d2 denote distances from a position of the driver's viewpoint in the long axis direction, and w1 and w2 denote predetermined widths on the ground at the distances d1 and d2.

Further features of the present invention will become apparent from the following description of embodiments with reference to the attached drawings.

BRIEF DESCRIPTION OF THE DRAWINGS

FIGS. 2A and 2B illustrate diagrams for explaining the optical characteristics of an image pickup unit according to the first embodiment.

FIG. 5 illustrates a diagram for explaining the conditions for installing the camera unit in a freight vehicle and the like.

DESCRIPTION OF THE EMBODIMENTS

Hereinafter, with reference to the accompanying drawings, favorable modes of the present invention will be described using Embodiments. In each diagram, the same reference signs are applied to the same members or elements, and duplicate description will be omitted or simplified.

First Embodiment

Figure 1:
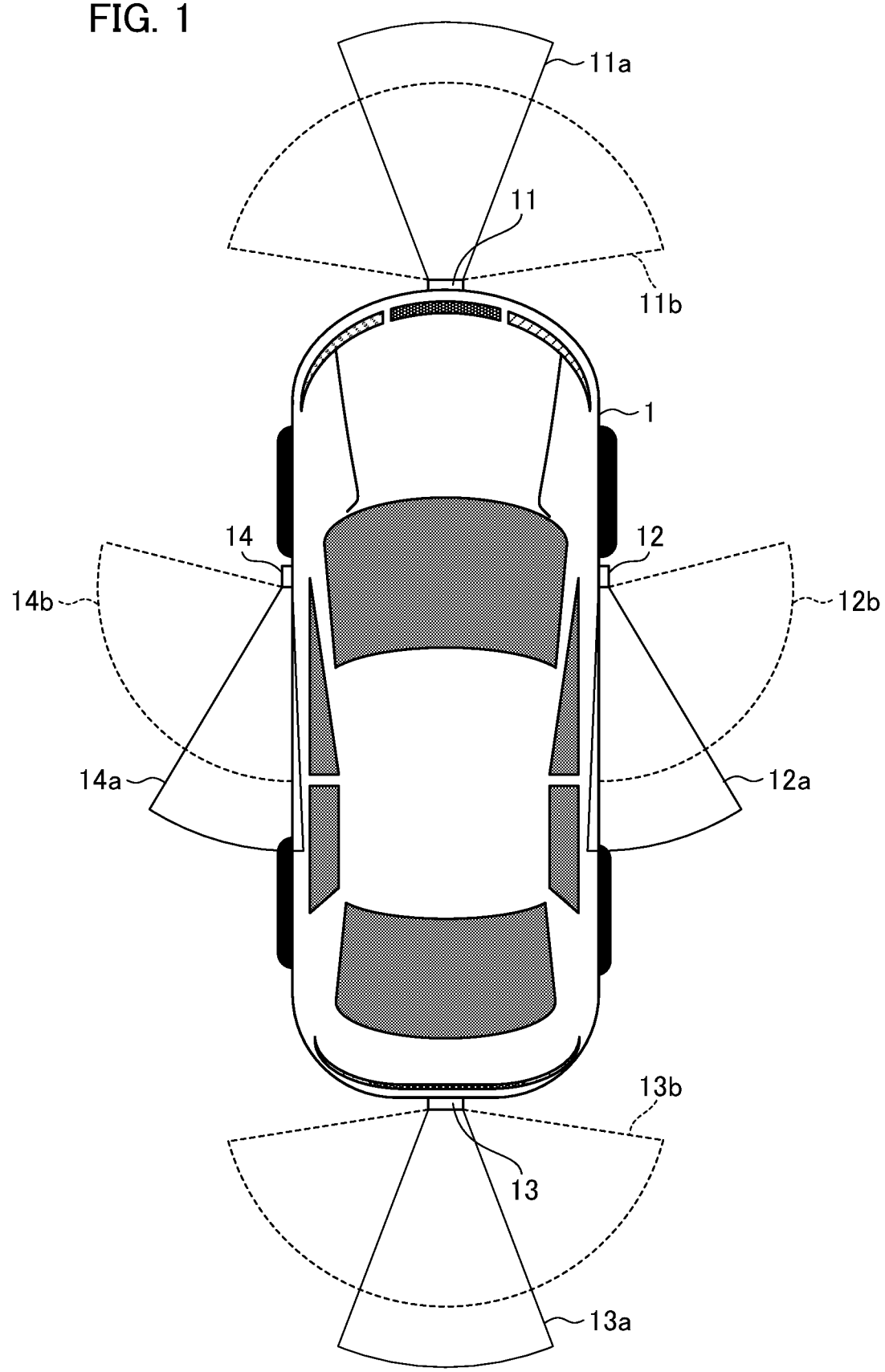
FIG. 1 illustrates a positional relation between a camera unit and a vehicle according to the first embodiment.

In the first embodiment, a description will be given of an image processing system that enables both a display for a high-definition electronic room mirror and a high-definition electronic side mirrors and a display for confirming the periphery of a vehicle including a wide rear view with a small number of cameras and enables the optimization of assignment of field angles. FIG. 1 illustrates the positional relation between a camera unit and a vehicle in the first embodiment.

In the first embodiment, camera units 11, 12, 13, and 14 are respectively installed on the front, the right side, the rear side, and the left side of a vehicle 1, which is, for example, an automobile serving as a movable unit, as shown in FIG. 1. Although, in the first embodiment, four camera units are provided, the number of camera units is not limited to four, and it suffices if at least one or more camera units are provided.

The camera units 11 to 14 are installed such that the image pickup range includes the front, the right side, the left side, and the rear side of the vehicle 1 serving as the mobile object. In the first embodiment, the camera units 11 to 14 have substantially the same configuration and they each have an image pickup element for picking up an optical image and an optical system for forming an optical image on a light-receiving surface of the image pickup element. For example, the camera units 11 to 14 are installed such that the optical axes of the optical systems of the camera units 11 and 13 are substantially horizontal, and the optical axes of the optical systems of the camera units 12 and 14 orient slightly downward from the horizontal or orient to face downward directly.

Additionally, the optical systems of the camera units 11 to 14 used in the first embodiment are each configured to be able to obtain a high-definition image at a narrow field angle around the optical axis, and obtain a picked-up image with a low-resolution at a wide field angle. Reference numerals 11a to 14a each denote an image-pickup field angle by which an image with high resolution and low distortion can be picked up, and reference numerals 11b to 14b each denote an image-pickup field angle by which an image with low resolution and high distortion can be picked up. Reference numerals 11b to 14b include regions of 11a to 14a.

The optical systems of the camera units 11 to 14 in the first embodiment will be described with reference to FIGS. 2A and 2B. Although the optical systems of the camera units 11 to 14 need not have the same characteristics, in the first embodiment, the optical systems of the camera units 11 to 14 have substantially the same characteristics, and the optical system of the camera units 11 will be described as an example.

FIGS. 2A and 2B are diagrams for explaining the optical characteristics of the image pickup unit in the first embodiment of the present invention, and FIG. 2A is a diagram showing, in contour form, an image height y at each half angle of view on the light receiving surface of the image pickup element of the optical system of the camera unit 11 in the first embodiment. FIG. 2B illustrates projection characteristics showing the relation between the image height y and the half angle of view $\theta$ of the optical system of the camera unit 11 in the first embodiment. In FIG. 2B, the half angle of view (an angle between the optical axis and the incident light beam) $\theta$ is defined as the horizontal axis, and the imaging height (image height) y on the sensor surface (on the image plane) of the camera unit 11 is defined as the vertical axis.

The optical system of the camera unit 11 in the first embodiment is configured such that there are difference in the projection characteristic $y(\theta)$ between a region having a predetermined half angle of view $\theta a$ or less and in a region having the half angle of view $\theta a$ or higher, as shown in FIG. 2B. Therefore, when an amount of increase in the image height y with respect to the half angle of view $\theta$ per unit is defined as resolution, the resolution differs depending on the regions. It can be said that this local resolution is represented by a derivative dy $(\theta)/d\theta$ at the half angle of view $\theta$ of the projection characteristic $y(\theta)$. That is, it can be said that as the inclination of the projection characteristic $y(\theta)$ in FIG. 2B is larger, the resolution is higher. Additionally, it can be said that as the distance between the image heights y at each of the half angle of view in contour form in FIG. 2A is larger, the resolution is higher.

In the first embodiment, the center-side (central portion) region formed on the sensor surface when the half angle of view $\theta$ is less than the predetermined half angle of view $\theta a$ is referred to as a "high-resolution region 10a", and the outward (peripheral portion) region where the half angle of view $\theta$ is equal to or higher than the predetermined half angle of view $\theta a$ is referred to as a "low-resolution region 10b". Note that the high-resolution region 10a corresponds to the image pickup field angle 21a, and the low-resolution region 10b corresponds to the image pickup field angle 21b.

Note that, in the first embodiment, a circle at the boundary between the high-resolution region 10a and the low-resolution region 10b is referred to as a "resolution boundary", and a boundary image on the display screen corresponding to the resolution boundary is referred to as a "display resolution boundary" or simply referred to as a "boundary image". Note that the boundary image displayed on the display screen (display resolution boundary) needs not be circular. For the sake of convenience, it may be rectangular or the like. Additionally, the boundary between the high-resolution region 10a and the low-resolution region 10bs needs not be circular, may be an ellipse, or may have a distorted shape.

The center of gravity of the boundary 93 (high-resolution region 10a) may not match the position where the optical axis of the optical system intersects the light receiving surface. However, in the first embodiment, since the center of gravity of the boundary 93 (high-resolution region 10a) substantially matches the position where the optical axis of the optical system intersects the light receiving surface, there are effects in which the optical system can be easily designed, stable optical characteristics can be obtained, and the load of distortion correction can be suppressed.

In the first embodiment, the high-resolution region 10a is a low distortion region in which distortion is relatively small, and the low-resolution region 10b is a high distortion region in which distortion is relatively large. Therefore, in the first embodiment, the high-resolution region corresponds to the low distortion region, the low-resolution region corresponds to the high distortion region, and the high-resolution region may be referred to as the "low distortion region" and the "low-resolution region" may be referred to as the "high distortion region". In contrast, the low distortion region may be referred to as the high-resolution region and the high distortion region may be referred to as the low-resolution region.

The optical system of the camera unit 11 in the first embodiment is configured such that its projection characteristic $y(\theta)$ is higher than $f \times \theta$ in the high-resolution region (low distortion region) 10a (f is a focal length of the optical system of the camera unit 11). The projection characteristic $y(\theta)$ in the high-resolution region (low distortion region) is set to be different from the projection characteristic in the low-resolution region (high distortion region). When $\theta$ max is the maximum half angle of view of the optical system of the camera unit 11, the ratio $\theta a/\theta$ max between $\theta a$ and $\theta$ max is desirably equal to or higher than a predetermined lower limit value, for example, 0.15 to 0.16.

The ratio $\theta a/\theta$ max between $\theta a$ and $\theta$ max is desirably equal to or less than a predetermined upper limit value, for example, 0.25 to 0.35. For example, when θ max is set to 90°, a predetermined lower limit value is set to 0.15, and a predetermined upper limit value is set to 0.35, it is desirable that θa is determined within a range of 13.5 to 31.5°. Furthermore, the optical system of the camera unit 11 is configured such that its projection characteristic y(θ) also meets Formula 1 below.

$$1 < f \times \sin(\theta \max)/y(\theta \max) < 1.9 \quad \text{(Formula 1)}$$

"f" is a focal length of the optical system of the camera unit 11 as described above. With the lower limit set at 1, the center resolution can be made higher than that of a fisheye lens for which the orthogonal projection method (that is, the case where y=f×sin θ is established) having the same maximum image height is used. With the upper limit set at 1.9, it is possible to maintain advantageous optical performance while obtaining a field angle equivalent to that of a fisheye lens. The upper limit may be determined by taking into consideration the balance between the resolution in the high-resolution region and the resolution in the low-resolution region, and the upper limit is desirably set in the range of 1.4 to 1.9.

With the configuration of the optical system as described above, high resolution can be obtained in the high-resolution region 10a, and, in the low-resolution region 10b, the amount of increase in the image height y with respect to the half angle of view θ per unit can be reduced, consequently, the image pickup at a wider angle of view can be achieved. Therefore, a high resolution can be obtained in the high-resolution region 10a with an image pickup range at a wide field angle that is equivalent to that of the fisheye lens.

Furthermore, according to the first embodiment, in the high-resolution region (low distortion region), since the characteristics are close to those of the central projection method (y=f×tan θ) or the equidistant projection method (y=f×θ), which are the projection characteristics of the normal imaging optical system, optical distortion is small, resulting in high precision display. Therefore, it is possible to obtain a natural sense of perspective when a surrounding vehicle and the like is visually observed, and it is possible to obtain satisfactory visibility while suppressing the deterioration of image quality.

The present invention is not limited to the projection characteristics shown in FIG. 2 because the same effect can be obtained if the projection characteristic y(θ) meets the condition of Formula 1. In the first embodiment, an optical system having the projection characteristic y(θ) that meets the condition of Formula 1 may be referred to as a "different-angle-of-view lens". The high-resolution regions 10a of the respective optical systems of the camera units 11 to 14 correspond to the imaging field angles 11a to 14a, and the low-resolution regions 10b correspond to the imaging field angles 11b to 14b.

In the first embodiment, the center of gravity of the high-resolution region 10a (the optical axis of the optical system) substantially overlaps the substantially center of the light receiving surface of the image pickup elements of the camera units 11 to 14, and the center of gravity of the high-resolution region 10a matches the position where the optical axis of the optical system intersects the light receiving surface. However, for example, the substantially center of the light receiving surface of the image pickup element and the center of gravity of the high-resolution region 10a (the optical axis of the optical system) may deviate in a predetermined direction (first direction). Additionally, the center of gravity of the high-resolution region 10a may deviate from the position where the optical axis of the optical system intersects the light receiving surface.

Figure 3:
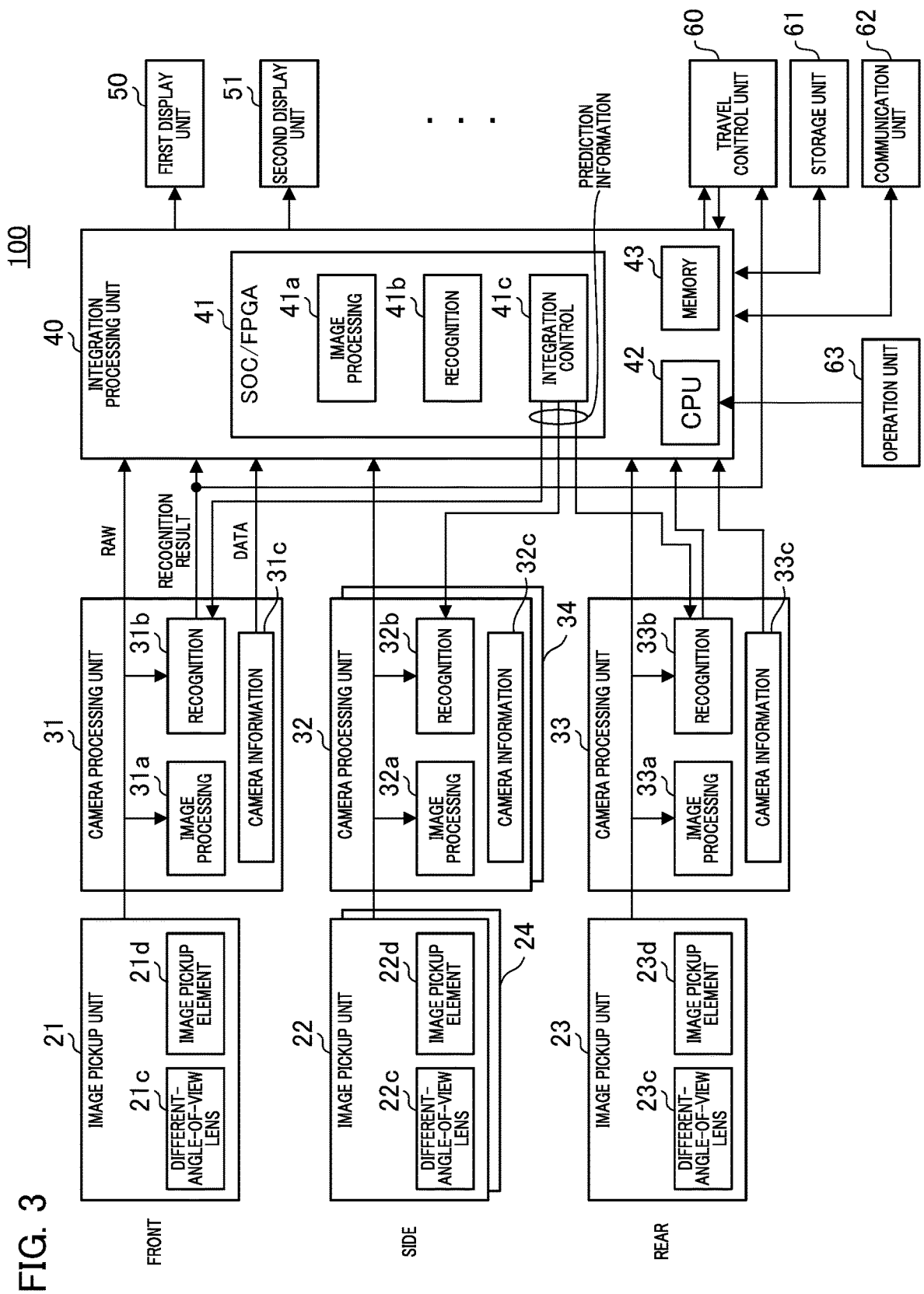
FIG. 3 illustrates a functional block diagram for explaining a configuration of an image processing system according to the first embodiment.

Next, a configuration of the image processing system in the first embodiment will be described with reference to FIG. 3. FIG. 3 is a functional block diagram for explaining the configuration of the image processing system in the first embodiment. In FIG. 3, the image processing system 100 is installed in the vehicle 1 serving as the mobile object, and image pickup units 21 to 24 and the camera processing units 31 to 34 are respectively disposed in the housings of the camera units 11 to 14.

The image pickup units 21 to 24 each have different-angle-of-view lenses 21c to 24c and image pickup elements 21d to 24d such as a CMOS image sensor and a CCD image sensor. Different-angle-of-view lenses 21c to 24c serving as an optical system are configured from one or more optical lenses, have the projection characteristic y(θ) that meets the condition of Formula 1, and form optical images having a low distortion region and a high distortion region on each of the light receiving surfaces of the image pickup elements 21d to 24d. The image pickup elements 21d to 24d functioning as image pickup means photoelectrically convert the optical image and output image pickup signals. On the light receiving surfaces of the image pickup elements 21d to 24d, for example, RGB color filters are arranged for each pixel. The array of RGB is, for example, Beyer array.

Therefore, the image pickup element sequentially outputs the R, G, R, G signals from a predetermined row and sequentially output the G, B, G, B signals from adjacent row, according to the Bayer array. Reference numerals 31 to 34 denote camera processing units that are housed in the same housing of the camera units 11 to 14 together with the image pickup units 21 to 24 and process image pickup signals output from the image pickup units 21 to 24. In FIG. 3, details of the image pickup unit 24, the camera processing unit 34, and wiring thereof are omitted for convenience's sake.

Camera processing units 31 to 34 each have image processing units 31a to 34a, recognition units 31b to 34b, and camera information units 31c to 34c. The image processing units 31a to 34a respectively perform image processing on the image pickup signals output from the image pickup units 21 to 24. A part or all the processing performed by the camera processing unit 31 may be performed by the signal processing units that are stacked in the image pickup elements 21d to 24d.

Specifically, the image processing units 31a to 34a respectively perform de-Bayer processing on the image data input from the image pickup units 21 to 24 according to the Bayer array, and convert the image data into image data in an RGB raster format. Furthermore, white balance adjustment, gain offset adjustment, gamma processing, color matrix processing, reversible compression processing, and the like may be performed.

The recognition units 31b to 34b perform image recognition on predetermined objects (for example, a vehicle, a person, an obstacle, and the like) based on the image data before distortion correction, for which image processing has been performed by the image processing units 31a to 34a. That is, the recognition units 31b to 34b perform the image recognition without performing distortion correction on the image data corresponding to the low distortion region and output a first image recognition result. The recognition units 31b to 34b in the first embodiment perform the image recognition processing on the image data obtained from at least the high-resolution region 10a to recognize a predetermined object. For this purpose, the image recognition processing may be performed after cutting out only the high-resolution region 10a.

At this time, the recognition units 31b to 34b may also perform the image recognition processing on the image data before distortion correction obtained from the low-resolution region 10b. However, since the distortion correction has not been performed, the image of the peripheral portion of the different-angle-of-view lens is distorted significantly, resulting in a decrease in recognition reliability. Alternatively, the recognition units 31b to 34b may cut out the image data obtained from the high-resolution region 10a and perform the image recognition processing only on the image data obtained from the high-resolution region 10a.

In that case, the region to be cut out for image recognition is desirably a rectangle that is a shape suitable for the image recognition processing. Additionally, the rectangular region to be cut out may be only a part in the high-resolution region 10a (for example, a rectangle that is inscribed in the high-resolution region 10a), or may be a rectangle including both the high-resolution region 10a and the low-resolution region 10b.

The recognition units 31b to 34b function as a first image recognition unit that recognizes images based on image signals in at least a partial region, from among the image signals acquired by the image pickup means and that outputs the first image recognition result. In the first embodiment, the partial region is a region corresponding to the low distortion region.

The recognition units 31b to 34b transmit a set of the type of the object and coordinates, which are used as the recognition result, to an integration processing unit 40. Additionally, the recognition units 31b to 34b receive information regarding the type of the object and a moving direction of the object and prediction information, which is a set of priority recognition region information, from an integration control unit 41c of the integration processing unit 40. This prediction information will be described below.

Here, the output of the recognition unit 31b of the camera unit 11 installed at the front of the vehicle (i.e. the mobile object) is also directly supplied to a travel control unit (ECU) 60. This is because there are cases in which travelling needs to be immediately stopped based on the recognition result obtained by the recognition unit 31b, for example, obstacles and the like, or travelling needs to be controlled to avoid the obstacles.

Camera information units 31c to 34c hold the camera information of the camera units 11 to 14 in advance in a memory. The camera information unit can temporarily hold information from various sensors provided in the camera units 11 to 14. The camera information includes characteristic information (for example, resolution boundary information) of the optical images formed by, for example, the different-angle-of-view lenses 21c to 24c, as shown in FIG. 2. The camera information also includes the number of pixels of the image pickup elements 21d to 24d, information regarding the install position coordinates and orientation (pitch, roll, yaw, and the like) of the camera unit in the vehicle coordinates, an image pickup direction, and the like. The camera information may include information such as gamma characteristics, sensitivity characteristics, and a frame rate.

Furthermore, the camera information may include information regarding an image processing method and an image format when image data are generated in the image processing units 31a to 34a. The installation position coordinates may be stored in the memory in the camera information unit in advance since, in many cases, the installation position of each camera unit in the vehicle has been determined. Additionally, the orientation coordinates of the camera unit are coordinates relative to the vehicle 1 and may be acquired from an encoder (not illustrated) provided in the camera unit. Alternatively, it may be acquired by using a three-dimensional acceleration sensor or the like.

Additionally, information regarding the image pickup direction may be acquired by using, for example, a geomagnetic sensor. Since the resolution boundary information of the camera is determined based on the lens design, it is stored in the memory in the camera information unit in advance. The camera information is unique information of the image pickup units 21 to 24, which is different from each other, the information is transmitted to the integration processing unit 40 and referred to when image processing and the like are performed in the integration processing unit 40. Here, the camera information units 31c to 34c function as holding means that hold characteristic information related to the characteristics of the optical image and the position and orientation information of the camera unit.

A CPU serving as a computer and a memory that stores a computer program, serving as a storage medium, are built in the camera processing units 31 to 34. Additionally, the CPU is configured to control each unit in the camera processing units 31 to 34 by executing a computer program in the memory.

In the first embodiment, the image processing units 31a to 34a and the recognition units 31b to 34b use hardware such as a dedicated circuit (ASIC) and a processor (reconfigurable processor, DSP). Thus, it is possible to realize high-speed image recognition in a high-resolution region and increase the possibility of avoiding an accident. The image processing units 31a to 34a may have a distortion correction function. Although a part or all of the internal functional blocks of the camera processing units 31 to 34 may be realized by causing the CPU to execute a computer program that is stored in the memory, in that case, increasing a processing speed of the CPU is desirable.

Reference numeral 40 denotes an integrated processing unit, which has an SOC (System On Chip)/FPGA (Field Programmable Gate Array) 41, a CPU 42 serving as a computer, and a memory 43 serving as a storage medium. The CPU 42 performs various controls of the entire image processing system 100 by executing a computer program being stored in the memory 43. In the first embodiment, the integration processing unit 40 is housed in a housing that is separate from the camera unit.

The SOC/FPGA 41 has an image processing unit 41a, a recognition unit 41b, and an integration control unit 41c. The image processing unit 41a obtains the image data from each of the camera processing units 31 to 34 and obtains the camera information of each of the camera units 11 to 14 from the camera information units 31c to 34c. As described above, the camera information includes the optical characteristics of the different-angle-of-view lenses 21c to 24c, the number of pixels of the image pickup elements 21d to 24d, the photoelectric conversion characteristics, the γ characteristics, the sensitivity characteristics, the image data format information, and information regarding the coordinates of the installation position and orientation of the camera units in the vehicle coordinates.

The image processing unit 41a serving as an image processing means acquires the camera information such as characteristic information of the optical system. Subsequently, resolution conversion is performed on each of the image data from the camera processing units 31 to 34 based on the camera information, and the image processing steps including distortion correction and the like are performed on the image signals obtained from the low-resolution region 10b of each of the image pickup units 21 to 24.

Specifically, distortion correction is performed on the image signal in the distortion correction region based on the characteristics of the optical image, and the image signal to which distortion correction has been performed and the image signal in the non-distortion correction region where distortion correction has not been performed are combined to generate a combined image. That is, the image processing unit 41a also functions as a display signal generation means, performs distortion correction and the like, and performs a display signal generation step for generating a combined image. In the first embodiment, the distortion correction region can be set by the user or can be set automatically.

In the first embodiment, the image processing unit 41a does not perform distortion correction because the image signal obtained from the high-resolution region 10a substantially has no distortion. However, the image processing unit 41a may perform simplified distortion correction on the image signal obtained from the high-resolution region 10a. Additionally, the image processing unit 41a appropriately performs lossy compression processing and the like on the image data from each of the camera processing units 31 to 34.

Additionally, the image processing unit 41a combines the image signals of the low-resolution regions 10b to which distortion correction has been performed, and the image signals of the high-resolution region 10a of each of the image pickup units 21 to 24 to be seamlessly connected, and forms an entire image of the image pickup units 21 to 24.

Note that when distortion correction is performed on both the image signal obtained from the low-resolution region 10b and the image signal obtained from the high-resolution regions 10a, distortion correction may be performed on the image data obtained by each of the image processing units 31a to 34a as-is. In the image processing unit 41a, image processing including rotation of images is performed based on the camera arrangement position and orientation information, in particular. The details will be described below.

The recognition unit 41b performs image recognition processing on the entire image of each of the image pickup units 21 to 24, in which distortion correction has been performed to at least the low-resolution region, and performs image recognition to a predetermined object (for example, an automobile, a person, an obstacle, and the like) in the entire image of each of the image pickup units 21 to 24. That is, the recognition unit 41b performs image recognition after distortion correcting is performed for the image signal corresponding to at least the low-resolution region (high distortion region), and outputs a second image recognition result.

At that time, the recognition result (object types and coordinates) obtained by the recognition units 31b to 34b are also referred to. Although, in the above description, the recognition unit 41b performs image recognition to the entire image of each of the image pickup units 21 to 24, the image recognition may not necessarily be performed to the entire image. For example, the image recognition may not necessarily be performed to the outermost peripheral portion of the image (in the vicinity of the outermost peripheral portion in FIG. 2).

In the first embodiment, although the recognition unit 41b performs image recognition for a wide region including, for example, a region recognized by the recognition units 31b to 34b, the recognition unit 41b may perform image recognition only for a region other than those recognized by the recognition units 31b to 34b. Here, the recognition unit 41b functions as a second image recognition means that performs image recognition of an image signal for a region wider than the partial region including a partial region where image recognition has been performed by the first image recognition unit, from among the image signals acquired by the image acquisition means, and outputs the second image recognition result. The second image recognition means performs the image recognition for a combined image obtained by combining image signals that correspond to the high-resolution region 10a, which is a low distortion region, and the low-resolution region 10b which is a high distortion region, and outputs the second image recognition result.

In the first embodiment, the image processing unit 41a combines images from the camera units 12 to 14, which are a plurality of image pickup units, such that images are connected together to form a panoramic combined image. In that case, it is desirable that the images from the image pickup units to be connected are set such that at least a part of the respective image pickup field angles have overlapping regions each having a predetermined amount or more.

As will be described below, the camera units 12 and 13 may be arranged such that their image pickup ranges overlap with each other. Alternatively, the camera units 13 and 14 may be arranged such that their image pickup ranges overlap with each other. Moreover, in that case, the camera units 13 and 14 may be arranged such that the image pickup ranges of the low distortion regions of at least two image acquisition means overlap with each other.

As described above, the recognition unit 41b performs image recognition on the panoramic combined image. Thus, image recognition for an object captured to cover the field angles of, for example, a plurality of image pickup units is enabled. This is because, there are cases in which, in the individual whole images from each of the image pickup units, the whole image of the object is not recognized, however, in the panoramic combined image, almost the whole of the object is reflected, and image recognition is enabled by the image processing.

For example, when the recognition results obtained by the recognition units 31b to 34b are different from the recognition result obtained by the recognition unit 41b the integration control unit 41c outputs an integrated image recognition result by adopting a recognition result that is highly reliable. For example, the ratio of the object recognized by the recognition units 31b to 34b in the image may be compared with the ratio of the same object recognized by the recognition unit 41b in the screen, and a recognition result having a higher ratio may be determined to be highly reliable and adopted.

Alternatively, if the object covers both the high-resolution region and the low-resolution region, the recognition result obtained by the recognition unit 41b may be determined to be higher reliable than the recognition result obtained by the recognition units 31b to 34b and may be adopted. Alternatively, if the object recognized by the recognition units 31b to 34b is located at the peripheral portion of the screen, the recognition result may be determined to be less reliable, and the recognition result obtained by the recognition unit 41b may be determined to be higher reliable and adopted.

Alternatively, in the recognition unit 41b the image recognition is performed only for the low-resolution region in a state in which the distortion correction is performed in the low-resolution region, and if the object that covers the low-resolution region and the high-resolution region is present, image recognition may be performed on the object. That is, regarding an object existing only in the high-resolution region, the recognition obtained by the recognition units 31b to 34b may be regarded as having higher reliability, and control may be performed so that the recognition unit 41b cannot perform the image recognition processing. Here, the integration control unit 41c functions as an integrated processing means that outputs an integrated image recognition result based on the reliability of the first image recognition result and the reliability of the second image recognition result.

Additionally, the integration control unit 41c forms signals for displaying a desired image from among the entire image of each of the image pickup units 21 to 24, the panoramic combined image, and the like , on a first display unit 50, a second display unit 51, and the like. Additionally, a frame for highlighting the recognized object, and CG for information regarding the type, size, position, speed and the like of the object and warning are generated. Furthermore, CG showing a boundary image for displaying a boundary may be generated based on the characteristic information of the optical system such as the display resolution boundary information acquired from the camera information units 31c to 34c.

Additionally, display processing for superimposing these CG(s) and characters on the image is performed. Here, the first display unit 50, the second display unit 51, and the like function as display means and display the image signals and the integrated image recognition result.

Furthermore, in the first embodiment, the integration control unit 41c is configured to share information regarding the object recognized between the camera units. That is, it is assumed that the object recognized in the camera unit 14 is recognized to move in the field angle direction of the camera unit 11. In that case, the integration control unit 41c transmits the information regarding the type of the object and the moving direction of the object or the prediction information including priority recognition region information to the recognition unit 31b of the camera unit 11.

Image recognition accuracy in the recognition units 31b to 34b of the camera units 11 to 14 can be improved by sharing such prediction information between the recognition units 31b to 34b of the camera units 11 to 14. The advantage of sharing such prediction information is effective when the recognition units 31b to 34b of the camera units 11 to 14 are separate from the recognition unit 41b of the integration processing unit 40, in particular.

The integration control unit 41c communicates with the travel control unit (ECU) 60 and the like through a communication means (not illustrated) provided therein by using protocols such as CAN, FlexRay and Ethernet. Thereby, display processing for appropriately changing information to be displayed is performed based on vehicle control signals received from the travel control unit (ECU) 60 and the like. That is, the range of the image to be displayed on the display means is changed according to, for example, a moving state of the vehicle acquired by the vehicle control signals.

The travel control unit (ECU) 60 is a unit installed in the vehicle 1 and includes a computer and a memory for comprehensively performing drive control and direction control for the vehicle 1. For example, vehicle control signals, which indicate information regarding the travel (moving state) of the vehicle such as a running speed, a running direction, the status of a shift lever, a shift gear, and a turn signal, and a direction of the vehicle obtained by a geomagnetic sensor are input from the travel control unit (ECU) 60 to the integration processing unit 40.

In contrast, the integration control unit 41c transmits the information regarding for example, the type, the position, the moving direction, and the moving speed of the predetermined object (for example, obstacles) recognized by the recognition unit 41b to the travel control unit (ECU) 60. Accordingly, the travel control unit (ECU) 60 performs necessary control for avoiding obstacles, for example, stopping the vehicle, driving the vehicle, and changing the travel direction of the vehicle. Here, the travel control unit (ECU) 60 functions as a motion operation control means for controlling the motion operation of the vehicle serving as a mobile object, based on the integrated image recognition result.

The first display unit 50 is installed, for example, near the center in the vehicle width direction at the front upper part of the driver's seat of the vehicle 1 in a state in which the display screen is directed toward the rear of the vehicle, and functions as an electronic room mirror. The first display unit 50 may be provided with a half mirror or the like so that it can be used as a mirror when it is not used as display. Additionally, the first display unit 50a may be provided with a touch panel and an operation button so that instructions from the user can be obtained and output to the integration control unit 41c. Additionally, the first display unit 50 can be used as an electronic side mirror for confirming obstacles on the right and left sides, instead of, for example, conventional optical side mirrors.

The second display unit 51 is disposed, for example, around an operation panel near the center in the vehicle width direction on the front of the driver's seat of the vehicle 1. A navigation system, an audio system, and the like (not illustrated) are installed in the vehicle 1 serving as a mobile object.

For example, the second display unit can display various control signals from the navigation system, the audio system, and the travel control unit (ECU) 60. The second display unit may be provided with a touch panel and an operation button so that instructions from the user can be obtained. The second display unit 51 may be, for example, a display unit of a tablet terminal, and may be displayed by being connected to the integration processing unit 40 by a wire or may be displayed by receiving an image wirelessly via the communication unit 62.

A liquid crystal display, an organic EL display, and the like can be used as the display panels of the first display unit 50 and the second display unit 51. The number of display units is not limited to three. A part or all of the functional blocks included in the integration processing unit 40 and the like may be implemented by hardware or may be implemented by causing the CPU 42 to execute a computer program being stored in the memory 43. As the hardware, a dedicated circuit (ASIC), a processor (reconfigurable processor, DSP), and the like can be used.

A part or all of the image processing performed by the image processing units 31a to 34a may be performed by the image processing unit 41a of the integration processing unit 40. That is, in the first embodiment, for example, the image acquisition means and the first image recognition means are housed in the same casing of the camera unit, and the camera unit and the second image recognition means are housed in separated casings. However, for example, the first image recognition means and the second image recognition means may be housed in the housing of the integration processing unit 40.

In the first embodiment, although the integration processing unit 40 is installed in the vehicle 1 serving as the mobile object, a part of the processing of the image processing unit

41a, the recognition unit 41b and the integration control unit 41c of the integration processing unit 40 may be performed by an external server via, for example, a network. In that case, for example, although the image pickup units 21 to 24 serving as image acquisition means are installed in the vehicle 1 serving as the mobile object, a part of the functions of the camera processing units 31 to 34 and the integration processing unit 40 can be processed by an external server and the like. It is also possible to provide a part or all the functions of the integration processing unit 40 to the travel control unit (ECU) 60.

Reference numeral 61 denotes a storage unit that stores the entire image of each of the image pickup units 21 to 24 and the panoramic combined image generated by the integration processing unit 40. Furthermore, CG, such as a predetermined frame, a character, a warning, and the like, indicating the recognized object, and images on which CG is superimposed and displayed on the first display unit 50, the second display unit 51, and the like are stored together with time, GPS information, and the like. The integration processing unit 40 can reproduce the past information being stored in the storage unit 61 and display it on the first display unit 50 and the second display unit 51.

Reference numeral 62 denotes a communication unit for communicating with an external server and the like via a network, in which the information before being stored in the storage unit 61 and the past information being stored in the storage unit 61 can be transmitted to the external server and the like so that the information can be stored in the external server or the like. It is also possible to transmit images to an external tablet terminal and the like and display the images on the second display unit 51 that is the display unit of the tablet terminal, as described above. It is also possible to acquire congestion information and various kinds of information from the external server and the like and display them on the first display unit 50 and the second display unit 51 via the integration processing unit 40. Reference numeral 63 denotes an operation unit for inputting various instructions to the image processing system by the user's operation. The operation unit includes, for example, a touch panel and an operation button.

Figure 4:
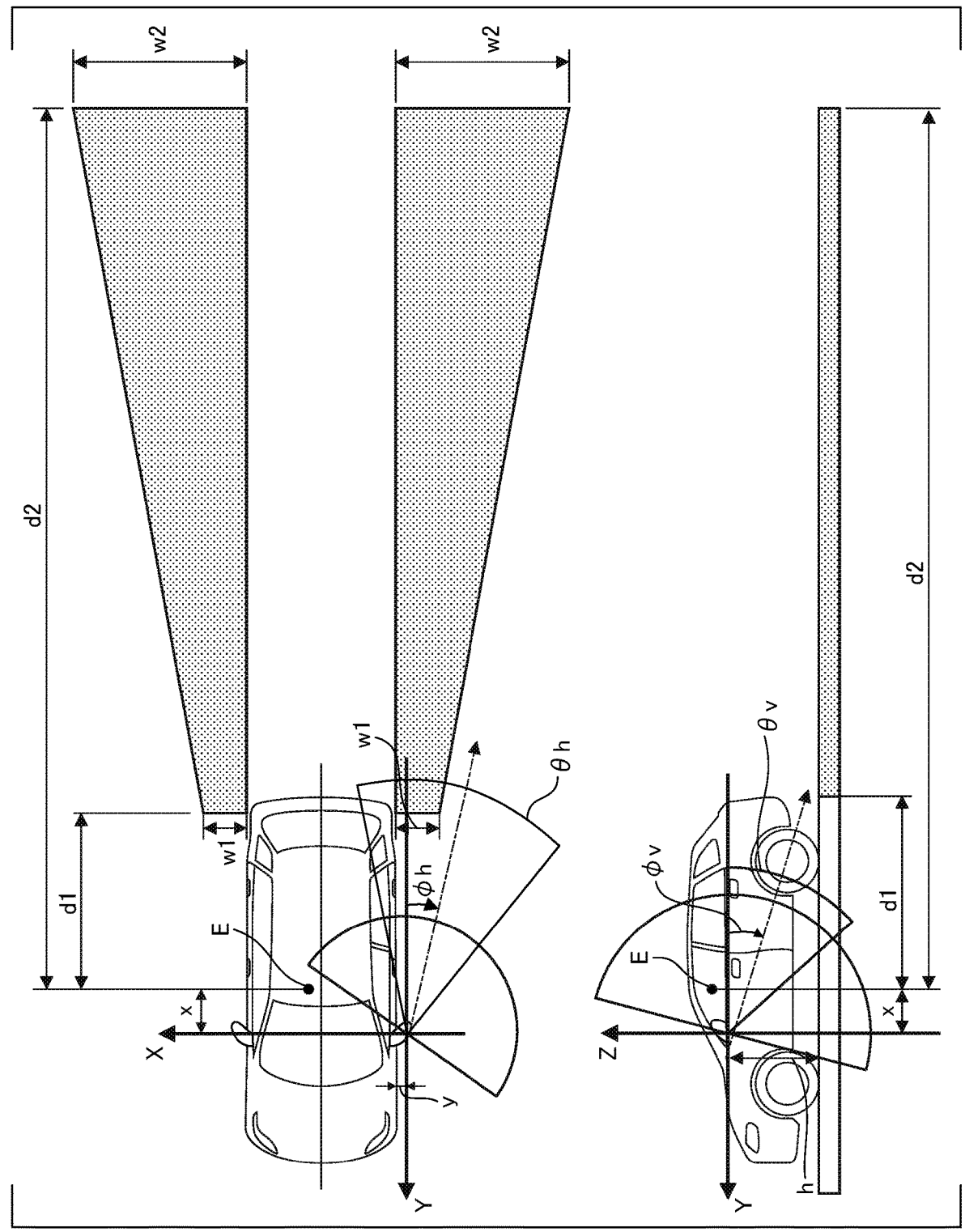
FIG. 4 illustrates a diagram for explaining the conditions for installing the camera unit in a vehicle 1 according to the first embodiment.

FIG. 4 illustrates conditions for installing the camera unit in the vehicle 1 in the first embodiment. In FIG. 4, reference numeral 14 denotes a camera unit that is installed on the left side, which captures an image for electronic side mirror display.

Additionally, in order for the driver to confirm the safety around the vehicle by the display of the electronic side mirrors, it is necessary to display regions on the ground at both sides and the rear of the vehicle as shown by hatchings in FIG. 4. Hereinafter, in the first embodiment, hatching regions in FIG. 4 are also referred to as "predefined regions". In FIG. 4, a region within the width w1 at the distance d1 backward from driver's viewpoint position E and a region on the ground within the width w2 at the distance d2 are defined as "predefined regions". This predefined region is desirably displayed on the first display unit 50. That is, d1 and d2 are distances backward from the driver's viewpoint position E in the X direction in FIG. 4, and w1 and w2 are respectively widths on the ground at the distances d1 and d2.

In order to display the predefined regions shown in FIG. 4 on the electronic side mirrors, it is necessary to install the camera unit 14 such that at least the predefined region is included within the imaging region of the camera unit 14. Therefore, in the first embodiment, the camera unit 14 is installed so that the predefined region can be picked up at an image-pickup field angle that corresponds to the high-resolution region 10a of the camera unit 14, which meets the condition of Formula 1.

Here, in order to form an image for the side mirrors such that the predefined region is displayed by using the high-resolution region 10a that meets the condition of Formula 1, it is desirable that the camera unit 14 is installed in the vertical direction so that the condition of Formula 2 below is met.

$$A \tan(h/(d1+x))-\theta v/2 < \varphi v < A \tan(h/(d2+x))+\theta v/2 \quad \text{(Formula 2)}$$

Additionally, in the horizontal direction, it is desirable that the camera unit 14 is installed such that the conditions of Formulae 3 and 4 below are met:

$$\varphi h\_\text{limit} = \max(A \tan((w1-y)/(d1+x))-\theta h/2, A \tan((w2-y)/(d2+x))-\theta h/2) \quad \text{(Formula 3)}$$

$$\varphi h\_\text{limit} < \varphi h < -A \tan(y/(d1+x))+\theta h/2 \quad \text{(Formula 4).}$$

Here, as shown in FIG. 4, $\theta v$ denotes the vertical field angle of the high-resolution region 10a, $\theta h$ denotes the horizontal field angle of the high-resolution region 10a, $\varphi v$ denotes the vertical angle of the optical axis of the optical system of the camera unit 14, and $\varphi h$ denotes the horizontal angle of the optical axis of the optical system of the camera unit 14. Additionally, x denotes the offset between the camera unit 14 and the driver's viewpoint position E in the long axis direction (X direction in FIG. 4) of the vehicle 1, and y denotes the offset between the camera unit 14 and the side surface of the vehicle in the short axis direction (Y direction in FIG. 4). Additionally, h denotes the offset between the camera unit 14 and the ground in the height direction (Z direction in FIG. 4).

The driver's viewpoint position E is the eye position at the driver's seating position or the center position of the driver's seat surface. Although the installation conditions of the camera unit 14 on the left side have been described above, the same conditions are applied to the camera unit 12 on the right side.

As described above, it is possible to pick up images in which the predefined region to be confirmed by the driver as shown in FIG. 2 is included within the field angle of the high-resolution region 10a by meeting the conditions of Formula 1 to Formula 4. Therefore, it is possible to appropriately display an image with high resolution and low distortion by the electronic side mirrors.

As described above, in the first embodiment, it is possible to perform image pickup in which the predefined region on the rear side of the vehicle is included within the image pickup range at the field angle of the high-resolution region 10a by meeting the conditions of Formulae 1 to 4. Therefore, the predefined region on the rear side of the vehicle can be displayed on the electronic side mirrors, and the driver can confirm the safety. Furthermore, since the high-resolution region 10a has low distortion and high resolution, the driver can visually see obstacles and the like in a timely manner due to the image with high resolution and low distortion.

Moreover, regarding the high-resolution region 10a, image recognition can be performed without delay by performing image recognition on the image data before distortion correction, it is also possible to quickly provide a notification regarding obstacle information and other information to the driver. Additionally, in automobiles, video images that are easy for the driver to confirm the safety can be displayed on the electronic side mirrors with complying with the regulation, for example, UN-R 46 (United Nations Regulation No. 46) by meeting the above Formulae 1 to 4.

As described above, according to the first embodiment, the high-resolution region (low distortion region) 10a has characteristics close to those of the center projection method (that is, the case where y=f×tan θ is established) or the equidistant projection method (that is, the case where y=f×θ is established), which are projection characteristics of the optical system for normal image pickup. Therefore, it is possible to achieve display with low optical distortion and high resolution. Additionally, a natural sense of perspective when a surrounding vehicle and the like are visually observed can be attained. It is also possible to attain satisfactory visibility while suppressing the deterioration of image quality and perform image recognition without performing distortion correction.

Even if the projection characteristic y(θ) that does not meet the condition of Formula 1, the camera unit that has the optical system that forms an optical image having the high-resolution region 10a and the camera unit may be installed so as to meet the condition of Formulas 2 to 4. Even in that case, an image with a high resolution and low distortion at a certain level can be visually recognized.

For example, in a passenger car for nine or fewer passengers or a small freight vehicle (for example, a vehicle weight of 3.5 tons or less), it is desirable that the driver can confirm the predefined regions such as d1=4 m, w1=1 m, d2=20 m, and w2=4 m with electronic side mirrors. In this case, for example, when the camera unit in which the vertical field angle θv and horizontal field angle θh of the high-resolution region 10a are each 47.5 degrees is used and the camera unit is installed at the position, x=0.5 m, y=0.2, and h=1 m, the vertical angle φv and the horizontal angle φh of the optical axis of the camera unit are each −11.07°<φv<26.4° and −13.1°<φh<26.1°.

The camera unit is installed such that that the optical axes of the cameras are aligned so as to meet these conditions.. Additionally, in a passenger car for 10 or fewer passengers and medium or large freight vehicles, since it is desirable that the driver can visually confirm more backward, it is desirable that the driver can confirm the predefined region, for example, d1=4 m, w1=1 m, d2=30 m, and w2=5 m with the electronic side mirrors. In that case, when a camera unit in which the vertical field angle θv and the horizontal field angle θh in the high-resolution region 10a are each 47.2 degrees is used and the camera unit is installed at the position, x=0.5 m, y=0.2 m, and h=1 m, the vertical angle φv and the horizontal angle φh of the optical axis of the camera unit are each −11.1°<φv<25.5° and −13.5°<φh<26.1°.

Although, in the numerical example described above, the angle condition of the optical axis of the camera unit in that case is calculated by using the installation position (x, y, h) of the camera unit as the fixed condition, the method for calculating the installation condition is not limited thereto if the conditions of Formulas 2 to 3 are met. For example, in the case in which the angle of the optical axis of the camera unit is determined in advance, which is used as a constraint condition in vehicle design, the range of the installation position of the camera unit that meets Formulae 2 to 3 is determined based on the angle.

Thus, the predefined region can be included within the image pickup range of the high-resolution region of the camera unit. Similarly, in the case in which the angle between the installation position of the camera unit (x, y, h) and the optical axis of the camera unit is determined in advance, which is used as a constraint condition in both designs, the vertical field angle θv and the horizontal field angle θh of the high-resolution region 10a of the camera unit that meet the conditions of Formula 2 to 3 may be respectively determined based on the angle.

Second Embodiment

In the second embodiment, the installation conditions in the case in which the camera unit is installed in a medium freight vehicle will be described. For example, the medium freight vehicle is desirably a vehicle having a gross weight of more than 3.5 tons and less than 12 tons, and more desirably a vehicle having a gross weight of more than 3.5 tons and less than 7.5 tons. In the medium freight vehicle, the driver needs to confirm the safety of a wider range in the side directions, in comparison to passenger cars or small freight vehicles.

Figure 5:
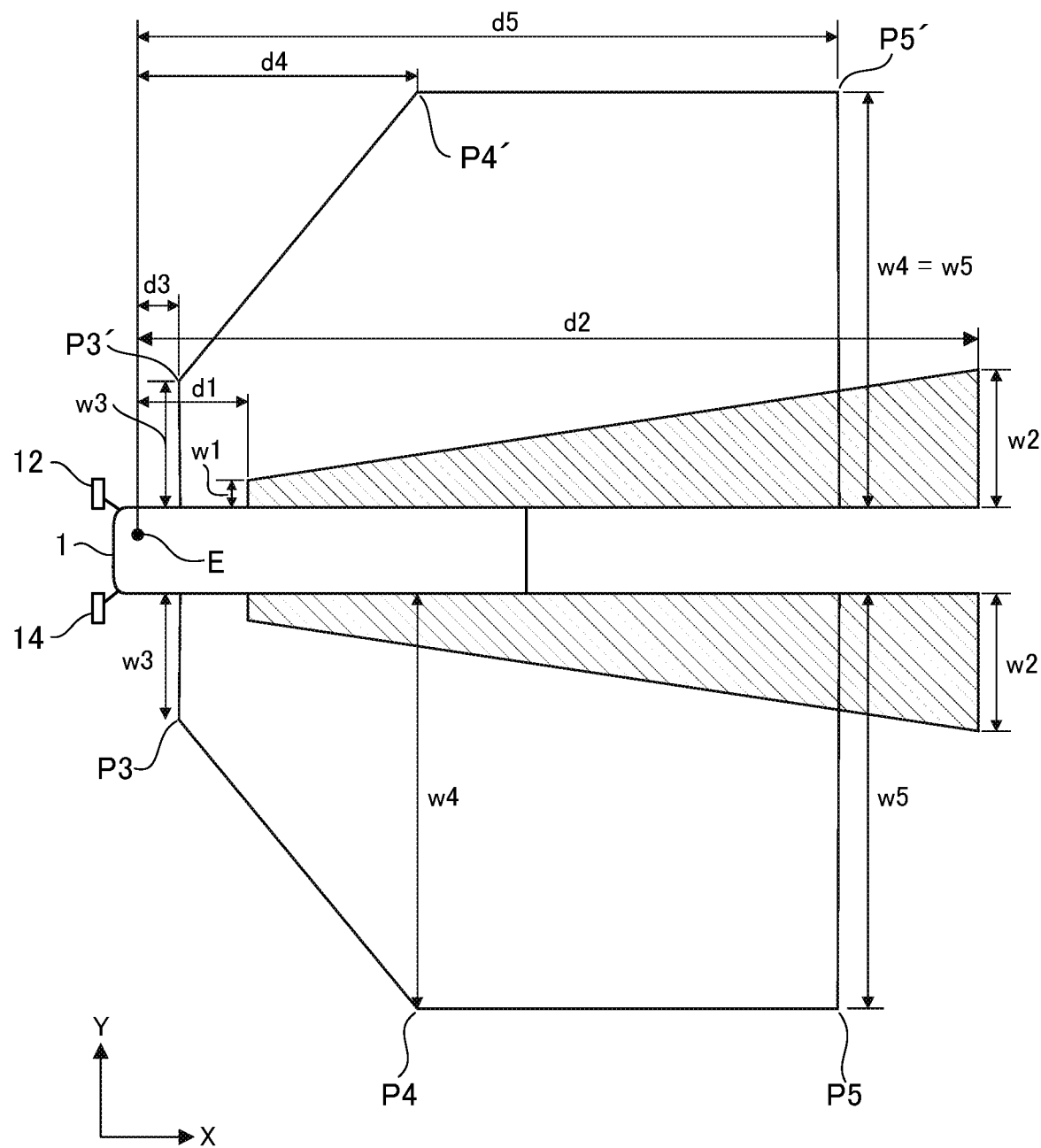
Figure 6:
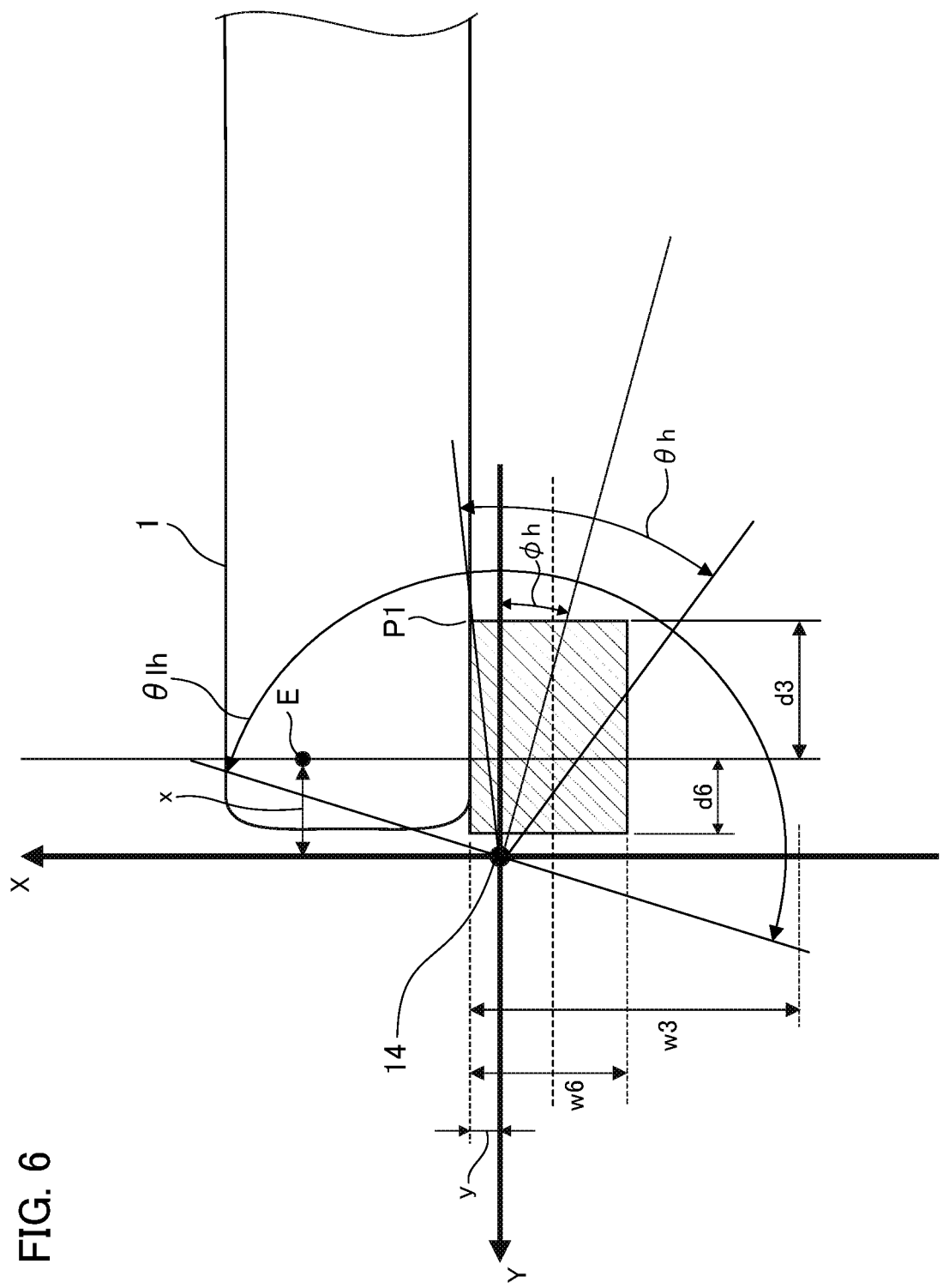
FIG. 6 illustrates an enlarged view of a part of FIG. 5.
Figure 7:
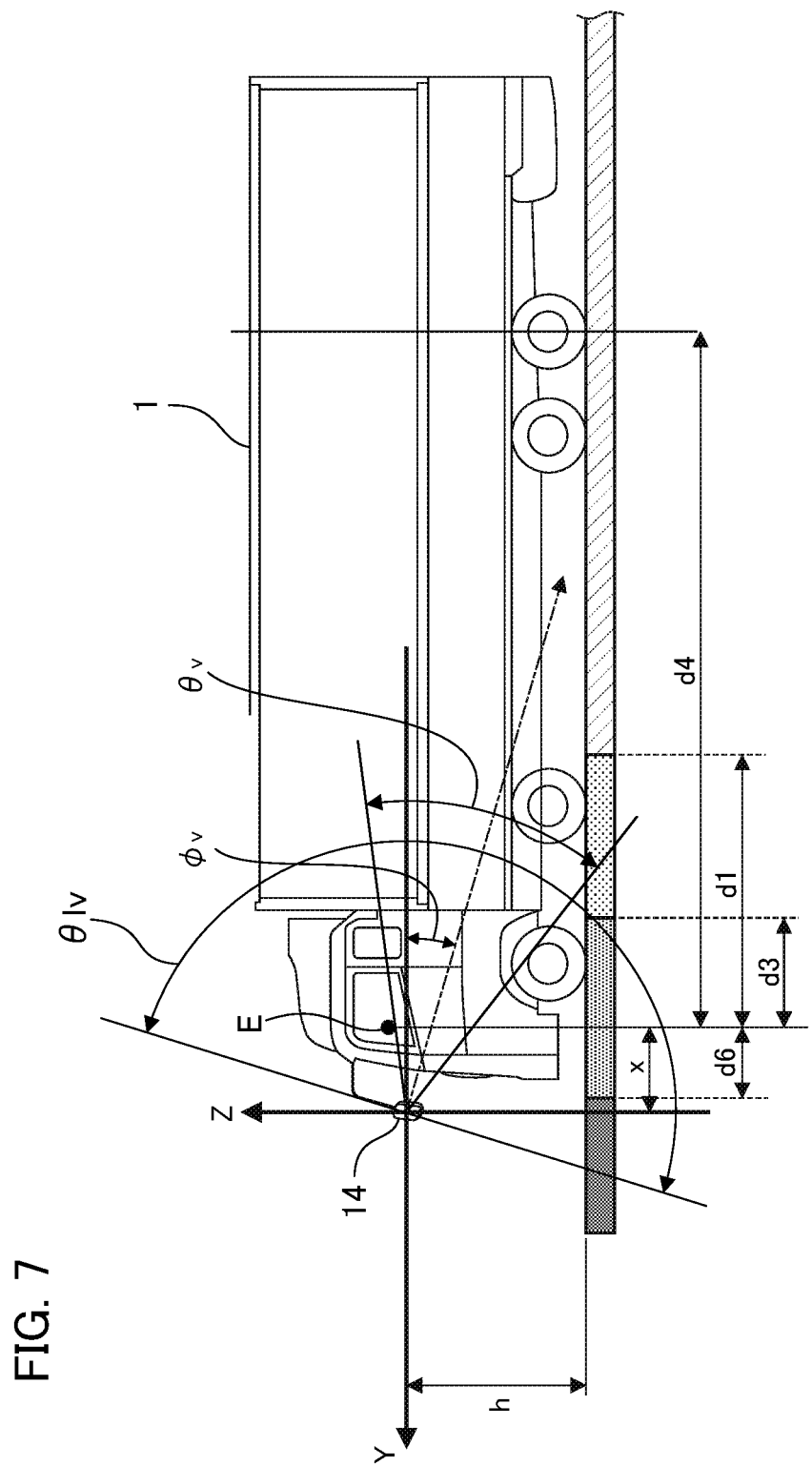
FIG. 7 illustrates the freight vehicle in FIGS. 5 and 6 viewed from a side face.

FIG. 5 illustrates the installation conditions in the freight vehicle and the like and FIG. 6 is a partially enlarged view shown in FIG. 5. Additionally, FIG. 7 illustrates the freight vehicle in FIG. 5 and FIG. 6 viewed from the side. As shown in FIGS. 5 to 7, it is desirable that the distances d1 to d6 from the driver's viewpoint E and the widths w1 to w6 corresponding to each of the distances are displayed on the electronic side mirrors so that the driver can confirm it.

The regions predefined by the widths w1 to w6 corresponding to each of the distances d1 to d6 are the predefined regions in the second embodiment. In the second embodiment, the camera unit is installed so that all of the predefined regions can be imaged in the high-resolution region 10a of the camera unit. In FIGS. 5, P3 to P5 respectively correspond to P3' to P5', and P3 to P5 are respectively symmetrical to P3' to P5', with respect to the center line in the long axis direction (X direction) of the vehicle 1.

As shown in FIG. 6, it is assumed that the camera unit 14 installed for the side mirror display is disposed forwardly from the driver's viewpoint position E by x and offset from the side of the vehicle by y. In the second embodiment, it is desirable that the position and angle of the camera unit 14 meet the Formulae 5 to 9 below in addition to the above Formulae 1 to 4 so that all of the predefined regions shown in FIG. 5 can be imaged in the high-resolution region 10a of the camera unit, Regarding the vertical direction, the following condition is desirably met:

$$A \tan(h/(d3+x)) - \theta v/2 > \varphi v \quad \text{(Formula 5)}.$$

Regarding the horizontal direction, the following condition is desirably met in order to image a point P1 on the vehicle body side at the distance d3:

$$A \tan(y/(d3+x)) + \theta h/2 > \varphi h \quad \text{(Formula 6)}.$$

Regarding the horizontal direction, the following condition is desirably met in order to image a point P3 outside the distance d3:

$$A \tan((w3-y)/(d3+x)) - \theta h/2 < \varphi h \quad \text{(Formula 7)}.$$

Regarding the horizontal direction, the following condition is desirably met in order to capture a point P4 outside the distance d4:

$$A \tan((w4-y)/(d4+x)) - \theta h/2 < \varphi h \quad \text{(Formula 8)}.$$

Regarding the horizontal direction, the following condition is desirably met in order to capture a point P5 outside the distance d5:

$$A \tan((w5-y)/(d5+x)) - \theta h/2 < \varphi h \quad \text{(Formula 9)}.$$

Here, d3 to d5 denote distances backward from the driver's viewpoint E in the X direction shown in FIGS. 5, and w3 to w5 denote widths extending outward from the side surfaces of the vehicle 1 in the Y direction shown in FIG. 5. Additionally, x denotes the offset between the driver's viewpoint E and the camera unit 14 in the long axis direction (X direction in FIG. 4) of the vehicle 1, and y denotes the offset between the camera unit 14 and the side surface of the vehicle in the short axis direction (Y direction in FIGS. 5 to 7). Additionally, h denotes the offset between the camera unit 14 and the ground in the height direction (Z direction in FIG. 7). In the second embodiment, w4=w5 is established.

Third Embodiment

In the third embodiment, the installation conditions in the case in which the camera unit is installed in a large freight vehicle will be described. It is desirable that the large freight vehicle is desirably a vehicle having a gross weight of more than 12 tons, and more desirably a vehicle having a gross weight of more than 7.5 tons. The camera unit is installed such that the regions of the width w1 at distance d1, the width w2 at distance d2, and the width w5 at distance d5, from among the predefined regions in the second embodiment, are included within the image pickup range in the high-resolution region of the camera unit.

In that case, Formulae 5, 6, and 9 are met as the installation conditions, in addition to the above conditions of Formulae 2 to 4. Specifically, regarding the vertical direction, the condition is Formula 5, and regarding the horizontal direction, the condition for imaging a point on the side of the vehicle 1 at the distance d3 is Formula 6, and the condition for imaging a point outside the distance d5 is Formula 9.

Fourth Embodiment

In the fourth embodiment, the regions of the width w4 at distance d4, the width w5 at distance d5, from among the predefined regions in the second embodiment, are included within the image pickup range in the high resolution region of the camera unit. In that case, Formulae 5, 6, 8, and 9 are met as the installation conditions, in addition to the above conditions of Formulae 2 to 4. Specifically, regarding the vertical direction, the condition is Formula 5, and regarding the horizontal direction, the condition for imaging a point on the side of the vehicle 1 at the distance d3 is Formula 6, the condition for imaging a point outside the distance d4 is Formula 8, and the condition for imaging a point outside the distance d5 is Formula 9.

Fifth Embodiment

In the fifth embodiment, the region predefined by the width w6 can be imaged in the low-resolution region 10b at the positions of the distances d6 and d3 shown in FIGS. 6 to 7, in addition to the predefined region in the first embodiment. Such a predefined region is desirably included within the image pickup range so that the ground opposite to the driver's seat side is confirmed. In this case, it is desirable that the conditions of Formulae 10 to 16 below are met, in addition to the conditions of Formulae 1 to 4 described above. In that case, the conditions of any one of the second embodiment to the fourth embodiment may also be met. Hence, it is possible to include each of the predefined regions within the image pickup range by one camera unit.

That is, when x>d6, as to the vertical direction, the following condition is desirably met:

$$A\tan(h/(x-d6))-\theta lv/2 < \varphi v \quad \text{(Formula 10).}$$

In addition, as to the horizontal direction, the following condition is desirably met:

$$A\tan((w6-y)/(x-d6))-\theta lh/2 < \varphi h < -A\tan(y/(x-d6))+\theta lh/2 \quad \text{(Formula 11).}$$

When x<d6, as to the vertical direction, the following condition is desirably met:

$$A\tan(h/(d6-x))+90°-\theta lv/2 < \varphi v \quad \text{(Formula 12).}$$

In addition, as to the horizontal direction, the following condition is desirably met:

$$A\tan((w6-y)/(x-d6))-\theta lh/2+90° < \varphi h < -A\tan(y/(x-d6))+\theta lh/2-90° \quad \text{(Formula 13).}$$

When x=d6, as to the vertical direction, the following condition is desirably met:

$$+90° < \varphi v+\theta lv/2 \quad \text{(Formula 14).}$$

In addition, as to the vehicle side in the horizontal direction, the following condition is desirably met:

$$-90° > \varphi h-\theta lh/2 \quad \text{(Formula 15).}$$

In addition, as to the outside in the horizontal direction, the following condition is desirably met:

$$+90° < \varphi h+\theta lh/2 \quad \text{(Formula 16).}$$

Here, it is assumed that θlv denotes the vertical field angle of the low-resolution region 10b and θlh denotes the horizontal field angle of the low-resolution region 10b. Although the camera unit 14 on the left side has been described in the above description in the first embodiment to the fifth embodiment, the same conditions are applied to the camera unit 12 on the right side.

As a specific example of the predefined region in the second embodiment to the fifth embodiment, it is desirable that the driver can confirm the predefined regions, for example, d1=4 m, w1=1 m, d2=20 m, w2=4 m, d3=1.5 m, w3=4.5 m, d4=10 m, and w4=15 m with the electronic side mirrors. Furthermore, it is desirable that the driver can confirm the predefined regions, d5=25 m, w5=15 m, d6=1 m, and w6=2 m with the electronic side mirrors. For example, if the installation position of the camera unit is x=1.1 m, y=0.3 m, h=2.3 m, the angle φv in the vertical direction and the angle φh in the horizontal direction of the optical axis of the camera unit are respectively, for example, 0.67 degrees<φv<17.9 degrees, −3.37 degrees<φh<17 degrees.

In the above description, it is assumed that the center of gravity of the high-resolution region 10a (the optical axis of the optical system) substantially overlaps the substantially center of the light receiving surface of the image pickup elements of the camera units 11 to 14, and the center of gravity of the high-resolution region 10a matches the position where the optical axis of the optical system intersects the light receiving surface. However, as described above, the center of gravity of the high-resolution region 10a (optical axis of the optical system) may deviate from the substantially center of the light receiving surface, and the center of gravity of the high-resolution region 10a may not match the position where the optical axis of the optical system intersects the light receiving surface. That is, for example, the center of gravity of the high-resolution region (low distortion region) 10a of the camera unit 14 may be arranged so as to deviate from the center of the light receiving surface 140 of the image pickup element toward the upper side (first direction) so that vignetting occurs.

Then, the direction of the vignetting (first direction) is set to be, for example, toward the direction of the vehicle 1, so that the field angle where imaging can be picked up outside the vehicle body is expanded, consequently, the image pickup angle can be optimized and the pixels of the image pickup element can be used as most effectively. The portion where the vignetting occurs is eliminated from the range of θlv and θlh. That is, Formulae 1 to 16 above are calculated in the first embodiment to the fifth embodiment so that the portion where vignetting occurs at the edges, θlv and θlh is not included.

As described above, in the first embodiment to the fifth embodiment, the high-resolution region (low distortion region) 10a is configured to have projection characteristics similar to the center projection method (That is, in the case where y=f×tan θ is established) or the equidistant projection method (That is, in the case where y=f×θ is established) of an optical system for normal image pickup. Therefore, for example, the image of the high-resolution region (low distortion regions) 10a displayed on the electronic side mirrors of the first display unit 50 and the like has a higher resolution than that of the low-resolution region (high distortion region) 10b and the far side of the vehicle 1 can be displayed more precisely. Moreover, it is excellent in cost, processing efficiency, miniaturization, and the like, in comparison to the case of picking up images of the sides by using a plurality of camera units having different field angles.

The manner of display is not limited if each of the predefined regions can be displayed. For example, the predefined regions predefined by the width w6 at the distances d6 and d3 and the predefined regions predefined by the widths w3 to w5 at the distances d3 to d5 may be cut out as individual images from the captured images of the camera unit and displayed on different display units. Additionally, the predefined regions predefined by the widths w1 and w2 at the distances d1 and d2 may be cut out from the captured images of the camera unit as individual images and displayed on different display units. Thus, it is possible to provide a display that is suitable for the purpose of each of the predefined regions.

Additionally, in one camera unit, the predefined region predefined by the width w6 at the distances d6 and d3, the predefined region predefined by the widths w3 to w5 at the distances d3 to d5, and a predefined region predefined by the widths w1 and w2 at the distances d1 and d2 are included within the image pickup range. Therefore, the configuration in which the captured image of the camera unit may be displayed on one display unit as-is may be adopted. Thus, it is possible to simplify the image cutting processing while allowing the driver to confirm the predefined regions.

Additionally, since the optical distortion of the high-resolution region 10a in the embodiments is low, the images for the electronic room mirror and the electronic side mirrors that are displayed on the first display unit 50 can also be displayed in a state in which the distortion is low, and, consequently, the driver can view the periphery of the vehicle with a more natural sense of perspective. Additionally, since the optical distortion is low in the high-resolution region 10a, it is possible to perform image recognition at the stage in which distortion correction has not been performed, consequently, the processing load for image recognition can be reduced and image recognition at a high speed can be achieved.

Therefore, it is possible to detect obstacles early based on the image recognition result, and it is possible to perform the operation for avoiding the obstacles in a timely manner. Such a configuration that meets the conditional formulae in the above-described embodiments achieves a significant effect when the vehicle is traveling at a high speed on, for example, a highway, in particular. Although the examples of using a plurality of camera units have been described in the above embodiments, the present invention is also effective in a system having only one camera unit.

Sixth Embodiment

At least one of the various functions, processes, and methods described above in the first embodiment to the fifth embodiment may be implemented by using a program. Hereinafter, in the sixth embodiment, a program for implementing at least one of the various functions, processes, and methods described in the first embodiment to the fifth embodiment described above is referred to as a "program X". Furthermore, in the fourth embodiment, a computer for executing the program X is referred to as a "computer Y". A personal computer, a microcomputer, a CPU (central processing unit) are examples of the computer Y. A computer, for example, the image processing system in the above-described embodiments, is also an example of the computer Y.

At least one of the various functions, processes, and methods described above in the first embodiment to the fifth embodiment may be implemented by the computer Y executing the program X. In this case, the program X is supplied to the computer Y via a computer-readable storage medium. The computer readable storage medium in the fourth embodiment includes at least one of a hard disk device, a magnetic storage device, an optical storage device, a magneto-optical storage device, a memory card, a ROM, a RAM, and the like. Furthermore, the computer readable storage medium in the fourth embodiment is a non-transitory storage medium.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions. In addition, as a part or the whole of the control according to the embodiments, a computer program realizing the function of the embodiments described above may be supplied to the moving object through a network or various storage media. Then, a computer (or a CPU, an MPU, or the like) of the moving object may be configured to read and execute the program. In such a case, the program and the storage medium storing the program configure the present invention.

This application claims the benefit of Japanese Patent Application No. 2021-156439 filed on Sep. 27, 2021, which is hereby incorporated by reference herein in its entirety.

What is claimed is:

1. A mobile object comprising:
a camera unit that includes an optical system that forms an optical image including a high-resolution region and a low-resolution region on a light receiving surface of an image pickup element and that is disposed on a side of the mobile object,
wherein $y(\theta)$ in the high-resolution region is greater than $f \times \theta$, where f denotes a focus length of the optical system, $\theta$ denotes a half angle of view, y denotes an image height on an image plane, $\theta$ max denotes the maximum half angle of view of the optical system, and $y(\theta)$ denotes a projection characteristic indicating a relationship between the image height y and the half angle of view $\theta$,
wherein the high-resolution region corresponds to a region where the half angle of view $\theta$ is less than the predetermined half angle of view θa, and the low-resolution region corresponds to a region where the half angle of view θ is equal to or higher than the predetermined half angle of view θa,
wherein 0.15≤θa/θ max≤0.35,
wherein the following condition is met in the high-resolution region:

$$1 < f \times \sin(\theta \max)/y(\theta \max) \leq 1.9 \quad \text{(Formula 1), and}$$

wherein the camera unit is installed to meet the following conditions:

$$A \tan(h/(d1+x)) - \theta v/2 < \varphi v < A \tan(h/(d2+x)) + \theta v/2 \quad \text{(Formula 2)}$$

$$\varphi h\_\text{limit} = \max(A \tan((w1-y)/(d1+x)) - \theta h/2, A \tan((w2-y)/(d2+x)) - \theta h/2 \quad \text{(Formula 3)}$$

$$\varphi h\_\text{limit} < \varphi h < -A \tan(y/(d1+x)) + \theta h/2 \quad \text{(Formula 4)},$$

where θv denotes a vertical field angle of the high-resolution region, θh denotes a horizontal field angle of the high-resolution region, φv denotes a vertical direction angle of the optical axis of the optical system, φh denotes a horizontal direction angle of the optical axis of the optical system, x denotes an offset between a driver's viewpoint position representing an assumed eye position at a seating position of a driver or a center position of a seat surface of the driver and the camera unit in the long axis direction of the mobile object, y denotes an offset between the camera unit and a side face of the mobile object in the short axis direction of the mobile object, h denotes an offset between the camera unit and the ground in the height direction, d1 and d2 denote distances from the driver's viewpoint position in the long axis direction, and w1 and w2 denote predetermined widths on the ground at the distances d1 and d2.

2. The mobile object according to claim 1, wherein the high-resolution region corresponds to a low distortion region, and
wherein the low-resolution region corresponds to a high distortion region.

3. The mobile object according to claim 2, wherein the low distortion region is configured to have a projection characteristic that is approximated to a central projection method or an equidistant projection method.

4. The mobile object according to claim 1, wherein w1 is 1 m, w2 is 4 m, the distance d1 is 4 m, and the distance d2 is 20 m.

5. The mobile object according to claim 1, wherein the camera unit is disposed to meet the conditions:

$$A \tan(h/(d3+x)) - \theta v/2 > \varphi v \quad \text{(Formula 5)}$$

$$-A \tan(y/(d3+x)) + \theta h/2 > \varphi h \quad \text{(Formula 6)}$$

$$A \tan((w3-y)/(d3+x)) - \theta h/2 < \varphi h \quad \text{(Formula 7)}$$

$$A \tan((w4-y)/(d4+x)) - \theta h/2 < \varphi h \quad \text{(Formula 8)}$$

$$A \tan((w5-y)/(d5+x)) - \theta h/2 < \varphi h \quad \text{(Formula 9)}$$

where d3 to d5 denote distances from the position of the driver's viewpoint in the long axis direction, and w3 to w5 denote predetermined widths on the ground at the distances d3 to d5.

6. The mobile object according to claim 1, wherein the camera unit is disposed to meet the following conditions:

$$A \tan(h/(d3+x)) - \theta v/2 > \varphi v \quad \text{(Formula 5)}$$

$$-A \tan(y/(d3+x)) + \theta h/2 > \varphi h \quad \text{(Formula 6)}$$

$$A \tan((w5-y)/(d5+x)) - \theta h/2 < \varphi h \quad \text{(Formula 9)},$$

where d3 and d5 denote distances from the position of the driver's viewpoint in the long axis direction, and w5 denotes a predetermined width on the ground at the distance d5.

7. The mobile object according to claim 1, wherein the camera unit is disposed to meet the following conditions:

$$A \tan(h/(d3+x)) - \theta v/2 > \varphi v \quad \text{(Formula 5)}$$

$$-A \tan(y/(d3+x)) + \theta h/2 > \varphi h \quad \text{(Formula 6)}$$

$$A \tan((w4-y)/(d4+x)) - \theta h/2 < \varphi h \quad \text{(Formula 8)}$$

$$A \tan((w5-y)/(d5+x)) - \theta h/2 < \varphi h \quad \text{(Formula 9)},$$

where d3 to d5 denote distances backward from the position of the driver's viewpoint in the long axis direction, and w4 and w5 respectively denote predetermined widths on the ground at the distances d4 and d5.

8. The mobile object according to claim 1, wherein the camera unit is disposed to meet the following conditions:
when x>d6, $$A \tan(h/(x-d6)) - \theta lv/2 < \varphi v \quad \text{(Formula 10)}$$

$$A \tan((w6-y)/(x-d6)) - \theta lh/2 < \varphi h < -A \tan(y/(x-d6)) + \theta lh/2 \quad \text{(Formula 11)}$$

when x<d6, $$A \tan(h/(d6-x)) + 90° - \theta lv/2 < \varphi v \quad \text{(Formula 12)}$$

$$A \tan((w6-y)/(x-d6)) - \theta lh/2 + 90° < \varphi h < -A \tan(y/(x-d6)) + \theta lh/2 - 90° \quad \text{(Formula 13), and}$$

when x=d6, $$+90° < \varphi v + \theta lv/2 \quad \text{(Formula 14)}$$

$$-90° > \varphi h - \theta lh/2 \quad \text{(Formula 15)}$$

$$+90° < \varphi h + \theta lh/2 \quad \text{(Formula 16)},$$

where d6 denotes a distance from the position of the driver's viewpoint in the long axis direction and w6 denotes a predetermined width on the ground at the distance d6.

9. The mobile object according to claim 1, further comprising at least one processor or circuit configured to function as:
a holding unit configured to hold information regarding a position and an orientation of the camera unit.

10. The mobile object according to claim 9, wherein the at least one processor or circuit is configured to further function as:
an image processing unit configured to process an image signal obtained from the camera unit based on the information regarding a position and an orientation of the camera unit.

11. The mobile object according to claim 10, wherein the image processing unit performs distortion correction on an image signal from the camera unit based on characteristic information of the optical system.

12. The mobile object according to claim 10, wherein the image processing unit performs image recognition on an image signal from the camera unit.

13. The mobile object according to claim 12, wherein the image processing unit combines image signals from the plurality of camera units to generate a combined image and performs the image recognition on the combined image.

14. The mobile object according to claim 10, wherein the image processing unit rotates an image signal obtained from the camera unit in a predetermined direction based on the information regarding a position and an orientation of the camera unit.

15. An image processing method to control a mobile object, wherein the mobile object comprises a camera unit that includes an optical system that forms an optical image including a high-resolution region and a low-resolution region on a light receiving surface of an image pickup element and that is disposed on a side of the mobile object, wherein $y(\theta)$ in the high-resolution region is greater than $f \times \theta$, where f denotes a focus length of the optical system, $\theta$ denotes a half angle of view, y denotes an image height on an image plane, $\theta$ max denotes the maximum half angle of view of the optical system and $y(\theta)$ denotes a projection characteristic indicating a relationship between the image height y and the half angle of view $\theta$, wherein the high-resolution region corresponds to a region where the half angle of view $\theta$ is less than the predetermined half angle of view $\theta a$, and the low-resolution region corresponds to a region where the half angle of view $\theta$ is equal to or higher than the predetermined half angle of view $\theta a$, wherein $0.15 \leq \theta a/\theta \max \leq 0.35$, wherein the following condition is met in the high-resolution region:

$1 < f \times \sin(\theta \max)/y(\theta \max) \leq 1.9$, and wherein the camera unit is installed to meet the following conditions:

$A \tan(h/(d1+x)) - \theta v/2 < \varphi v < A \tan(h/(d2+x)) + \theta v/2$ (Formula 2)

$\varphi h\_\text{limit} = \max(A \tan((w1-y)/(d1+x)) - \theta h/2, A \tan((w2-y)/(d3+x)) - \theta h/2)$ (Formula 3)

$\varphi h\_\text{limit} < \varphi h < -A \tan(y/(d1+x)) + \theta h/2$ (Formula 4), where $\theta v$ denotes a vertical field angle of the high-resolution region, $\theta h$ denotes a horizontal field angle of the high-resolution region, $\varphi v$ denotes a vertical direction angle of the optical axis of the optical system, $\varphi h$ denotes a horizontal direction angle of the optical axis of the optical system, x denotes an offset between a driver's viewpoint position representing an assumed eye position at a seating position of a driver or a center position of a seat surface of the driver and the camera unit in the long axis direction of the mobile object, y denotes an offset between the camera unit and a side face of the mobile object in the short axis direction of the mobile object, h denotes an offset between the camera unit and the ground in the height direction, d1 and d2 denote distances from the driver's viewpoint position in the long axis direction, and w1 and w2 denote predetermined widths on the ground at the distances d1 and d2, and wherein the image processing method comprises processing an image signal obtained from the camera unit based on information regarding a position and an orientation of the camera unit.

16. A non-transitory computer-readable storage medium configured to store a computer program to control a mobile object, the mobile object including a camera unit that includes an optical system that forms an optical image including a high-resolution region and a low-resolution region on a light receiving surface of an image pickup element and that is disposed on a side of the mobile object, wherein $y(\theta)$ in the high-resolution region is greater than $f \times \theta$, where f denotes a focus length of the optical system, $\theta$ denotes a half angle of view, y denotes an image height on an image plane, $\theta$ max denotes the maximum half angle of view of the optical system and $y(\theta)$ denotes a projection characteristic indicating a relationship between the image height y and the half angle of view $\theta$, wherein the high-resolution region corresponds to a region where the half angle of view $\theta$ is less than the predetermined half angle of view $\theta a$, and the low-resolution region corresponds to a region where the half angle of view $\theta$ is equal to or higher than the predetermined half angle of view $\theta a$, wherein $0.15 \leq \theta a/\theta \max \leq 0.35$, wherein the following condition is met in the high-resolution region:

$1 < f \times \sin(\theta \max)/y(\theta \max) \leq 1.9$, and wherein the camera unit is installed to meet the following conditions:

$A \tan(h/(d1+x)) - \theta v/2 < \varphi v < A \tan(h/(d2+x)) + \theta v/2$ (Formula 2)

$\varphi h\_\text{limit} = \max(A \tan((w1-y)/(d1+x)) - \theta h/2, A \tan((w2-y)/(d2+x)) - h/2)$ (Formula 3)

$\varphi h\_\text{limit} < \varphi h < -A \tan(y/(d1+x)) + \theta h/2$ (Formula 4), where $\theta v$ denotes a vertical field angle of the high-resolution region, $\theta h$ denotes a horizontal field angle of the high-resolution region, $\varphi v$ denotes a vertical direction angle of the optical axis of the optical system, $\varphi h$ denotes a horizontal direction angle of the optical axis of the optical system, x denotes an offset between a driver's viewpoint driver's viewpoint position representing an assumed eye position at a seating position of a driver or a center position of a seat surface of the driver and the camera unit in the long axis direction of the mobile object, y denotes an offset between the camera unit and a side face of the mobile object in the short axis direction of the mobile object, h denotes an offset between the camera unit and the ground in the height direction, d1 and d2 denote distances from the driver's viewpoint position in the long axis direction, and w1 and w2 denote predetermined widths on the ground at the distances d1 and d2, and wherein the computer program comprises instructions for executing a process comprising processing an image signal obtained from the camera unit based on information regarding a position and an orientation of the camera unit.

* * * * *